(12) United States Patent
Jeffery et al.

(10) Patent No.: US 10,986,518 B2
(45) Date of Patent: Apr. 20, 2021

(54) MONITORING AND TRACKING NON-COOPERATIVE DEVICES

(71) Applicant: KIANA ANALYTICS INC., Sunnyvale, CA (US)

(72) Inventors: Stuart Sanders Jeffery, Los Altos, CA (US); Glenn R. Seidman, Woodside, CA (US); Klaus ten Hagen, Gorlitz (DE)

(73) Assignee: KIANA ANALYTICS INC., Sunnyvale, CA (US)

( * ) Notice: Subject to any disclaimer, the term of this patent is extended or adjusted under 35 U.S.C. 154(b) by 40 days.

(21) Appl. No.: 16/669,378

(22) Filed: Oct. 30, 2019

(65) Prior Publication Data
US 2020/0145856 A1   May 7, 2020

Related U.S. Application Data

(60) Provisional application No. 62/755,982, filed on Nov. 5, 2018.

(51) Int. Cl.
*H04B 7/00* (2006.01)
*H04B 1/10* (2006.01)
(Continued)

(52) U.S. Cl.
CPC ........ *H04W 24/08* (2013.01); *G06F 16/2379* (2019.01); *H04W 4/029* (2018.02);
(Continued)

(58) Field of Classification Search
CPC ....... H04W 24/08; H04W 4/029; H04W 4/80; H04W 88/16; H04W 84/18; G06F 16/2379
(Continued)

(56) References Cited

U.S. PATENT DOCUMENTS 10,605,890 B1 * 3/2020 Yun .................... H04B 17/3911
2015/0105038 A1 * 4/2015 Lascari ................ H04B 1/0075
455/230

(Continued)

OTHER PUBLICATIONS

Jayakody et al., "Indoor Positioning: Novel Approach for Bluetooth Networks using RSSI Smoothing," International Journal of Computer Application (0975-8887), Mar. 2016, vol. 137—No. 13.

*Primary Examiner* — Don N Vo
(74) *Attorney, Agent, or Firm* — Lewis Roca Rothgerber Christie LLP

(57) ABSTRACT

System and method for monitoring and tracking of non cooperative devices in a communication network that includes a plurality of radio signal-enabled devices communicating with each other includes: monitoring, by each of the plurality of radio signal-enabled devices, interference signals and frequencies of the interference signals from a plurality of non-cooperative devices that are not coupled to the communication network; receiving interference signals and the frequencies from the plurality of radio signal-enabled devices; recording a power level for each of the received interference signals; identifying signals of interest and filtering out signals of no interest responsive to the power levels; detecting a unique device identification for a non-cooperative user device not coupled to the communication network, responsive to the identified signals of interest; and tracking the non-cooperative user device responsive to the identified signals of interest and the predetermined locations of the plurality of radio signal-enabled devices.

20 Claims, 8 Drawing Sheets

(51) Int. Cl.
  *H04W 24/08*    (2009.01)
  *H04W 4/029*    (2018.01)
  *G06F 16/23*    (2019.01)
  *H04W 4/80*     (2018.01)
  H04W 88/16      (2009.01)
  H04W 84/18      (2009.01)

(52) U.S. Cl.
  CPC .............. *H04W 4/80* (2018.02); *H04W 84/18* (2013.01); *H04W 88/16* (2013.01)

(58) Field of Classification Search
  USPC ................................ 375/260, 346; 455/41.2
  See application file for complete search history.

(56) References Cited

U.S. PATENT DOCUMENTS

| | | | |
|---|---|---|---|
| 2019/0053013 A1* | 2/2019 | Markhovsky | G01S 5/06 |
| 2020/0348662 A1* | 11/2020 | Cella | G05B 23/024 |

* cited by examiner

6.3.3 Sync Word

The sync word is a 64-bit code word derived from a 24 bit address (LAP): for the CAC the master's LAP is used; for the GIAC and the DIAC, reserved, dedicated LAPs are used; for the DAC, the slave LAP is used. The construction guarantees large Hamming distance between sync words based on different LAPs. In addition, the good auto correlation properties of the sync word improve timing acquisition.

FIG. 7B

1.2 BLUETOOTH DEVICE ADDRESSING

Each Bluetooth device shall be allocated a unique 48-bit Bluetooth device address (BD_ADDR). This address shall be obtained from the IEEE Registration Authority. The address shall be created in accordance with section 9.2 ("48-bit universal LAN MAC addresses") of the IEEE 802-2001 standard (http://standards.ieee.org/findstds/standard/802-2001.html) and using a valid Organizationally Unique Identifier (OUI) obtained from the IEEE Registration Authority (see http://standards.ieee.org/regauth/oui/forms/ and sections 9 and 9.1 of the IEEE 802-2001 specification). The LAP and UAP form the significant part of the BD_ADDR. The bit pattern in Figure 1.5 is an example BD_ADDR.

| LSB | | | MSB |
|---|---|---|---|
| company_assigned | | company_id | |
| LAP | UAP | NAP | |
| 0000 0001 0000 0000 0000 0000 0001 0010 | 0111 | 1011 0011 | 0101 |

Figure 1.5: Format of BD_ADDR

FIG. 7A

The access code consists of a preamble, a sync word, and possibly a trailer, see Figure 6.3 on page 117. For details see Section 6.3.1 on page 117.

| LSB 4 | 64 | 4 MSB |
|---|---|---|
| PREAMBLE | SYNC WORD | TRAILER |

Figure 6.3: Access code format

6.3.1 Access Code Types

The different access code types use different Lower Address Parts (LAPs) to construct the sync word. The LAP field of the BD_ADDR is explained in Section 1.2 on page 69. A summary of the different access code types is in Table 6.1 on page 117.

| Code type | LAP | Code length | Comments |
|---|---|---|---|
| CAC | Master | 72 | |
| DAC | Paged device | 68/72[1] | See also Section 1.3 on page 70 |
| GIAC | Reserved | 68/72[1] | |
| DIAC | Dedicated | 68/72[1] | |

Table 6.1: Summary of access code types

1. Length 72 is only used in combination with FHS packets

MONITORING AND TRACKING NON-COOPERATIVE DEVICES

CROSS-REFERENCE TO RELATED APPLICATIONS

This Patent Application claims the benefits of U.S. Provisional Patent Application Ser. No. 62/755,982, filed on Nov. 5, 2018 and entitled "Non Cooperative Monitoring and Tracking of Bluetooth Users;" the entire contents of which are hereby expressly incorporated by reference.

FIELD OF THE INVENTION

The present invention relates generally Bluetooth-based devices, and more specifically to a method for enabling non-cooperative Bluetooth-based devices.

BACKGROUND

There are two versions of Bluetooth, both of which are frequency hoppers at 1600 hops per second in the 2.7 GHz ISM band. Bluetooth Classic (also called BR and BR/EDR is the older version of Bluetooth and hops over 79 channels, with 1 MHz spacing. The 1600 hops per second, results in slot time of 625 microsecond. Bluetooth LE (also called BLE) is a new version of Bluetooth and is optimized for short duration messages as is typical of Internet of things (IoT) devices. BLE operates in the same ISM band except it hops over 40 channels, with 2 MHz spacing. The BLE channels are coincident with the BR channels as shown in FIG. 5A. Bluetooth messages are sent as short packets with a header address followed by the payload. Both versions of Bluetooth use the same modulation (GFSK) for the header while the payload modulation maybe different, depending on the specific mode of operation.

Smart lights which can be centrally controlled are being installed in many buildings as a way of improving energy usage. Many of these smart light systems use mesh Bluetooth as the communication technology, meaning that every light fixture has a Bluetooth communication circuit. These widely deployed Bluetooth light fixtures can be used to detect and locate Bluetooth asset tags and the network can be used to communicate to various cooperative devices such as a user's mobile phone with an application for in building navigation. The Bluetooth Special Interest Group (SIG) has defined many services that use these in building networks.

Smart light systems have many useful features, including centralized control of various lights in a building, structure, street, public venue and the like, enabling alignment with building occupancy. They are also capable of "fault location" by sending status such as if the light is burnt out.

A typical Bluetooth smart light installation is depicted in FIG. 1. Smart lights 102 are typical of smart lights that are spread around a structure, a building or a zone of interest. The light is typically generated by Light Emitting Diodes (LEDs) that are driven by a power source. The power source converts line power (e.g., 110 or 220 V) into power compatible with the LED. Each smart light 102 has a Bluetooth module 106 with mesh communications functions and lamp control functions and may also include a processor 107 as part of the Bluetooth module 106 or as a separate component. Each smart light can then interconnect to a lamp controller 105 though a Bluetooth communication network 103 and a gateway 104. The lamp controller 105 can send commands to the Bluetooth module in each smart light 102 to turn it on or off, adjust its intensity and even color.

Bluetooth uses Generic Attribute Profile (GATT) to define services and support interoperability between devices. In FIG. 1 the mesh GATTs is used to support communication between system elements and a device GATT to support device control, such as lamp on/off, color, etc.

Although the present description herein is directed to Bluetooth wireless technology in a user Personal Area Network (PAN), one skilled in the art would recognize that the disclosed invention is not limited to Bluetooth technology and is applicable to other wireless technologies, such as WiFi, Zigbee™, Lora™, Home CE™, all versions of cellular (including 5G) and the like, and the public or private networks that support such technologies.

Typical devices that may operate in a PAN include smart phones, wireless watches, wireless hearing aids, wireless medical/health devices, wireless headsets, personal property tags and the like. Most of these devices communicate to a user's smart phone. Both Classic Bluetooth (BT) and Bluetooth Low Energy (LE) may be used in a PAN. Compared to Classic Bluetooth, Bluetooth Low Energy is intended to provide considerably reduced power consumption and cost while maintaining a similar (and in some case longer) communication range.

A physical channel is used for communication between Bluetooth devices (e.g., master and slave devices), however, because a Bluetooth-based system is a frequency hopper, a given physical channel uses many of the 40 or 79 radio channels. Consequently, active access codes are an indicator of Bluetooth communication being persistent over a communication session.

FIG. 2 is a block diagram illustrating a typical Bluetooth-based smart light network configuration. As shown, a lamp controller 202 is used to control multiple smart lights 204. Commands to the smart lights 204, such as on, off, half level, etc. are transmitted to the Bluetooth mesh communications network 203 via a BT/LAN gateway 201. Each smart light has a unique address (and optionally a group address) so the lamp controller 202 can individually, or by a group, address and adjust individual and cluster of lights. GATTs are used to define specific functions to support interoperability of the smart lights 204 and several GATTs may apply to control each smart light.

An expanded view of a smart light is shown in block 205. As depicted, commands from lamp controller 202 are received by a network interface device 207 and is stored in a local database 208. Each command, for example, "time on" command, may have an execution instruction to be executed by a lamp execution device (e.g., a lamp processor or controller) 209, for example, at a time designated by the execution instruction. Accordingly, the lamp controller 202 can send an "on" command to the smart lights 204 with sufficient warning so that the messages can propagate through the network 203, for example, for all lights (or a portion thereof) to come on at the same time. In some implementations, the functions of the network interface device 207 may be implemented in software (and/or firmware) routines that reside in a physical memory chip and are executed by the lamp processor 209 inside the smart lights.

A Bluetooth radio (interface) circuit 206, as described above, operates as a mesh network interface in this case. The processing bandwidth burden on the Bluetooth interface circuit 206 in performing mesh communications is very low and optionally it can be used for other functions. For example a hospital might install BLE (Bluetooth Low Energy) asset tags on various equipment that moves around. If the hospital has also been outfitted with an array of smart lamps, the BT radio (206) could detect and measure the signal level of the asset tag that is within radio range and thus determine the location of the equipment, relative to the smart lamp.

Another application is to detect and track the presence of mobile phone users who have installed tracking application on their phone, typically called a loyalty program. In this case, the user installs on their phone a shopping list for a specific department store. When the user enters the area being surveyed by the smart lamp network, the user's phone loyalty BLE advertisement is intercepted and is recognized as a service supported by the loyalty control device 212. The loyalty control device 212 sends authentication credentials to the intercepting smart lamp Bluetooth module and after authentication, a short session between the devices unfolds, typically only a few milliseconds long. The session then passes the user shopping list to the network and then the user is provided with important information, such as the location in the store of items on the shopping list and in the store, etc.

An IoT network is a network of interrelated computing devices, mechanical and digital machines, objects, animals or people that are provided with unique identifiers (UIDs) and the ability to transfer data over a network without requiring human-to-human or human-to-computer interaction. IoT devices and networks are gaining substantial popularity in the fields of embedded systems, wireless sensor networks, control systems, medical and health care, automation including home and building automation, smart automobiles and smart homes.

SUMMARY

In some embodiments, the disclosed invention is a system for monitoring and tracking of non-cooperative devices. The system includes: a communication network; and a plurality of radio signal-enabled devices communicating with each other via the communication network, each of the plurality of radio signal-enabled devices including a processor, associated memory, network interface and a predetermined location. Each of the plurality of radio signal-enabled devices is configured to monitor interference signals and frequencies of the interference signals from a plurality of non-cooperative devices that are not coupled to the communication network. The system further includes a second processor coupled to the communication network that is configured to: receive interference signals and the frequencies from the plurality of radio signal-enabled devices, record a power level for each of the received interference signals; identify signals of interest and filter out signals of no interest responsive to the power levels, detect a unique device identification for a non-cooperative user device not coupled to the communication network, responsive to the identified signals of interest, and track the non-cooperative user device responsive to the identified signals of interest and the predetermined locations of the plurality of radio signal-enabled devices.

In some embodiments, the second processor is the same as one or more of the processor(s) of the radio signal-enabled device(s). That is, one or more of the processor(s) of the radio signal-enabled device(s) are configured to perform the above-mentioned functions of the second processor.

In some embodiments, the disclosed invention is a method for monitoring and tracking of non-cooperative devices in a communication network that includes a plurality of radio signal-enabled devices communicating with each other. The method includes: monitoring, by each of the plurality of radio signal-enabled devices, interference signals and frequencies of the interference signals from a plurality of non-cooperative devices that are not coupled to the communication network; receiving interference signals and the frequencies from the plurality of radio signal-enabled devices; recording a power level for each of the received interference signals; identifying signals of interest and filtering out signals of no interest responsive to the power levels; detecting a unique device identification for a non-cooperative user device not coupled to the communication network, responsive to the identified signals of interest; and tracking the non-cooperative user device responsive to the identified signals of interest and the predetermined locations of the plurality of radio signal-enabled devices.

In some embodiments, the disclosed invention is a non-transitory computer storage medium for storing a plurality of computer instructions, the plurality of computer instructions, when executed by a processor, performing a method for monitoring and tracking of non cooperative devices in a communication network that includes a plurality of radio signal-enabled devices communicating with each other. The method includes: monitoring, by each of the plurality of radio signal-enabled devices, interference signals and frequencies of the interference signals from a plurality of non-cooperative devices that are not coupled to the communication network; receiving interference signals and the frequencies from the plurality of radio signal-enabled devices; recording a power level for each of the received interference signals; identifying signals of interest and filtering out signals of no interest responsive to the power levels; detecting a unique device identification for a non-cooperative user device not coupled to the communication network, responsive to the identified signals of interest; and tracking the non-cooperative user device responsive to the identified signals of interest and the predetermined locations of the plurality of radio signal-enabled devices.

The plurality of radio signal-enabled devices may be a plurality of Bluetooth devices or a plurality of Internet of Things (IoT) devices, or other similar networked devices.

The tracking information may be used to analyze behavior of a user using the non-cooperative user device and to predict what the user will do while in an area covered by the plurality of radio signal-enabled devices. Prediction of what the user will do while in the area includes one or more of predicting a future travel path of the non-cooperative user device, predicting what web sites the user will visit, and what products or services a user using the non-cooperative user device is likely to purchase. Moreover, the tracking information may be used to recognize the non-cooperative user device when the non-cooperative user device returns to an area covered by the plurality of radio signal-enabled devices in a future time, for example, for security purposes.

BRIEF DESCRIPTION OF THE DRAWINGS

These and other features, aspects, and advantages of the present invention will become better understood with regard to the following description, appended claims, and accompanying drawings.

FIGS. 7A-7C show data structures of the access code of a Bluetooth protocol described in Bluetooth Specification.

DETAILED DESCRIPTION

Figure 1:
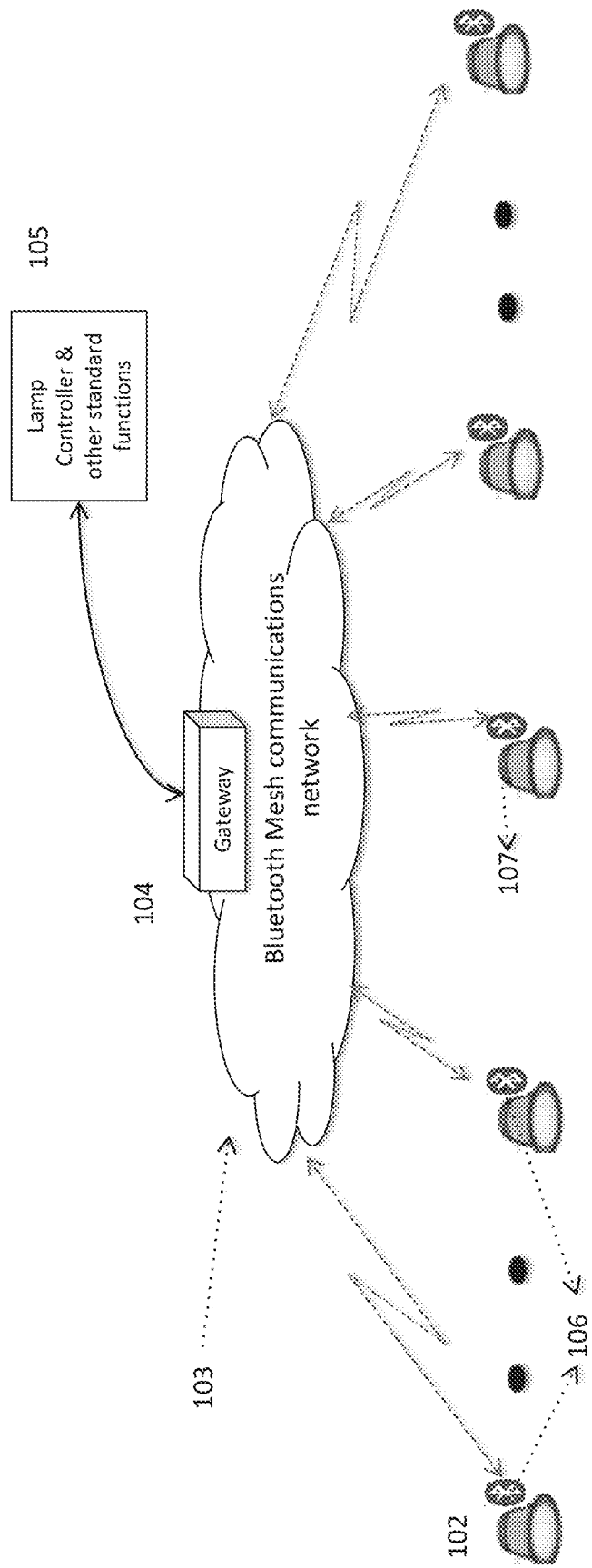
FIG. 1 shows a typical Bluetooth smart light system.

In some embodiments, the disclosed invention is directed to enhancements to existing wireless networks, such as smart lights networks, Internet of things (IoT) networks, or other similar types of wireless device networks, which can be centrally controlled, to enable non-cooperative devices that have no connection to a network to be detected and tracked. This capability of detection and tracking is of great value to many parties (e.g., managers of the smart buildings, public forum security personnel, automobile traffic control and the like) as it provides visibility into space utilization, security, crowd management by showing how wireless users (e.g., Bluetooth or other wireless users) are located within an area or zone of interest. Moreover, the disclosed invention does not compromise user's privacy since only the radio message address is detected and tracked and the user remains anonymous. Also, there may be no examination of the user's message traffic.

Typically, the Bluetooth devices and many other radio signal-enabled devices, such WiFi (or any other radio signal)-enabled devices or IoT devices, go through various steps to establish communications, for example, they discover each other, determine if they want to exchange information and exchange various secret keys among themselves to initiate the communication. The units then enter to a connected state.

In some embodiments, the disclosed invention can be realized by the addition of software to the processors of radio signal-enabled devices in a network, for example smart lamps (as described above) or IoT devices. In many cases, this processor may have sufficient spare processing power and memory to accommodate the enhancements without any burden. In some cases, a more powerful (e.g., central) processor and additional memory maybe used. In some embodiments the processes of the disclosed invention may be stored on a transitory computer storage medium and then downloaded into the processors of radio signal-enabled devices or the more powerful (e.g., central) processor.

Although the present disclosure is using Bluetooth and smart lamp networks as examples to describe the disclosed invention, one skilled in the art would recognize that the disclosed invention is not limited to Bluetooth protocols, rather, it is applicable to all radio signal-enabled devices and wireless protocols, for example, Zigbee™, Lora™, Home CE™, cellular, WiFi and the like protocols, collectively referred to as radio signal protocols. Similarly, the disclosed invention is not limited to smart lamps, rather, it is applicable to any network of radio signal-enabled devices or wireless smart devices with suitable interface and processing power, including IoT devices, that are using the same communication protocol as that of the pre-existing network. These devices are collectively referred to as "radio signal-enabled devices," hereinafter.

As an example, the data structure of the access code of a Bluetooth protocol is described in Bluetooth Specification, Version 4.2, Vol 2, Part B, where some drawings from that specification are reproduced in FIGS. 7A-7C. In some embodiments, the disclosed invention detects and records participant radio signal-enabled devices that are connected to one another and every message packet between the participating devices has the same access code. As depicted in FIG. 7A, the structure of the access code includes a preamble (used only for synchronization), a Sync word, and an optional trailer. The Sync word construction is explained in FIG. 7C indicating that the Lower Address Part (LAP) is derived from the 802-2001 IEEE MAC standard as explained in FIG. 7B. FIG. 7A shows there are four versions of the access code. In some embodiments, the disclosed invention may address access codes when it is in the Channel Access Code (CAC) mode. In the CAC mode, the LAP is from the communication master in a network. Thus, the access code during a connection when it is in the CAC mode is a stable signature for tracking paired. A detailed description of detecting unique device identifications is described in U.S. Pat. No. 9,998,907, entitled "Method and Apparatus for Uniquely Identifying Wireless Devices," the entire contents of which is hereby expressly incorporated by reference.

In some embodiments, by using the access code (or any unique device identification) in the CAC mode of the Bluetooth protocol or unique device identification for any other radio signal protocol, it may be possible to circumvent the privacy mode of the protocol. For example, the LE privacy mode in Bluetooth involves using a random address in the upper layers of the LE data packet every 10 or 15 minutes or on a new connection. However this randomization is performed at a higher layer in the Bluetooth protocol stack and appears to not be related to the access code in the CAC mode. As a result, a given (non-cooperative) user device that is not connected to the network may be tracked despite LE address changes.

Figure 3:
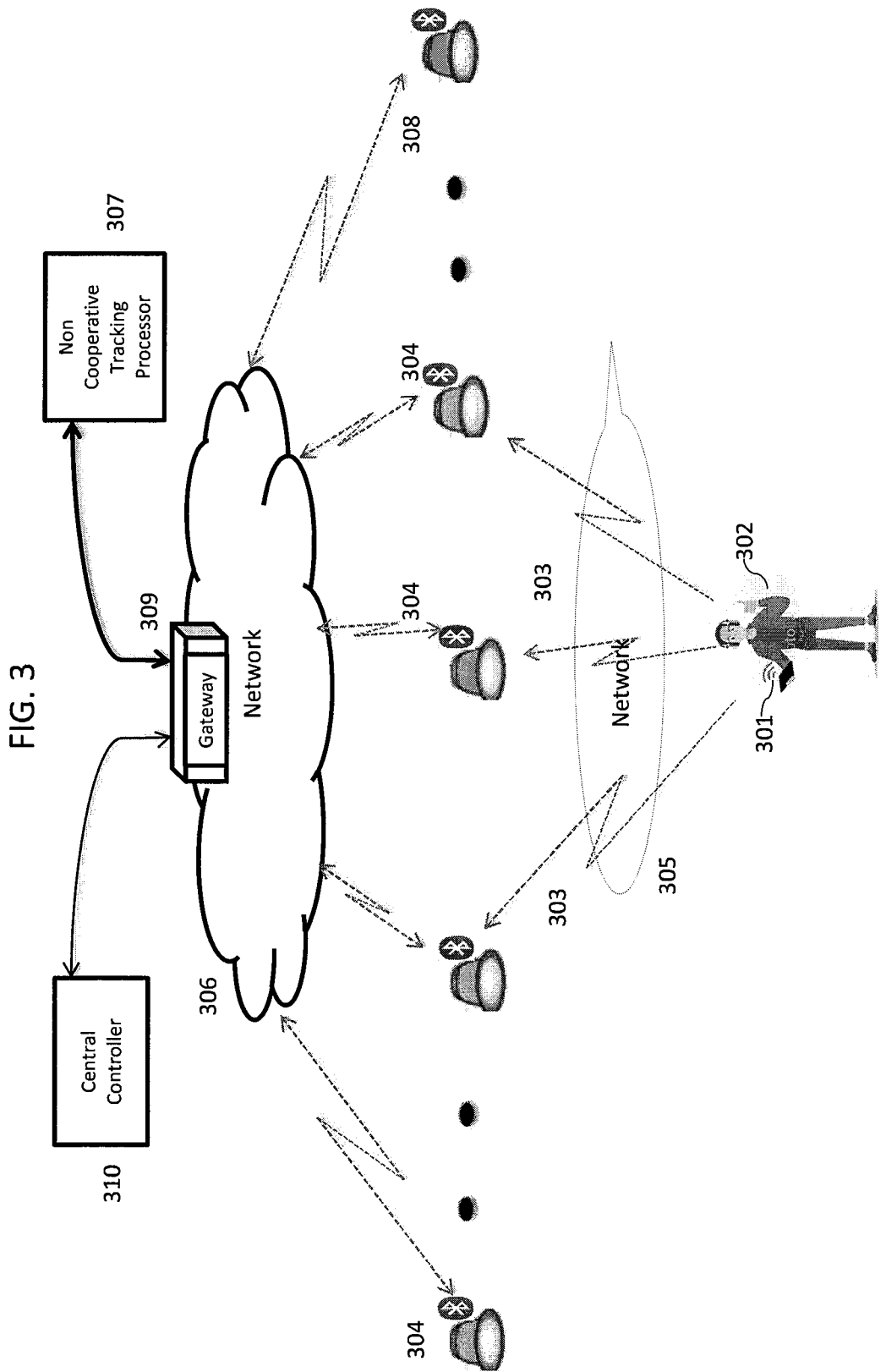
FIG. 3 is a block diagram of an exemplary network of radio signal-enabled devices, such as smart lights or IoT devices for monitoring a network, according to some embodiments of the disclosed invention.

FIG. 3 is a block diagram of an exemplary network of radio signal-enabled devices, such as smart lights or IoT devices for monitoring a network, according to some embodiments of the disclosed invention. Network 306 may be controlled by a central processor/controller 310. As shown, a user 302 interfaces with a network 305 that is used for the various radio signal-enabled devices 304 and 308, for example, smart lamps or IoT devices, to communicate with each other. The user 302 may have a radio signal device 301, for example, a Bluetooth emitting smart phone or headset, which enables the user to hear audio from his/her smart phone, audio music player, podcast player or hearing aid. This user radio signal device 301 is not in communication (unconnected) with the network 305 and therefore is deemed as a non-cooperative user device. The user may also have on his person an exercise logging watch, pacemaker, smart watch (not shown), etc., as non-cooperative user devices. Since these devices use radio signals (typically, Bluetooth or WiFi signals), if the radio signals from the user device(s) can be detected by some of the radio signal-enabled devices 304 (e.g., smart lamps or IoT devices), and the signal strength is recorded with a time stamp, since the location of the radio signal-enabled devices 304 are known, it is possible to determine the location of the radio signal transmitter (of the non-cooperative user device 301) and thus its user, by using standard signal strength plotting techniques. Signal strength indicator (RSSI location estimation is a well-established technique and is used by many companies. See, for example, "Indoor Positioning: Novel Approach for Bluetooth Networks using RSSI Smoothing," J.A.D.C Anuradha Jayakody, Shashika Lokuliyana, Dinusha Chathurangi, and Demini Vithana, International Journal of Computer Applications (0975-8887) Volume 137-No. 13, March 2016; the entire contents of which is expressly incorporated by reference herein.

In some embodiments, the disclosed invention modifies the operation of a standard radio signal transmitter (e.g., a Bluetooth or WiFi radio) of a radio-signal-enabled device so that it can detect radio signal connections of one or more non-cooperative user devices that are engaged in the communication with devices, other than the existing wireless network (hence, non-cooperative devices) and therefore overcoming the deficiency noted above. In the case of Bluetooth signals, a (non-cooperative) smart phone usually has a dual mode Bluetooth interface to enable it to simultaneously support Classic BT and LE. Because LE data exchanges are typically very short (a few tens of milliseconds) and infrequent (once every several seconds), the phone can support several different LE devices in sequence.

The signals from the non-cooperative (unconnected) user devices 301 are collected, processed (for example, to calculate their power strength) and sent over network 306 to a Non-Cooperative Tracking (NCT) processor 307, via a gateway 309. The NCT processor 307 then utilizes the received signal power, for example, received signal strength indicator (RSSI) of the radio signals from the non-cooperative user devices 301 as observed at different radio signal-enabled devices 304 to estimate the location of the radio signal-enabled devices 304 (and their users) in the covered area. For example, as a user moves to the left, radio signal-enabled device 308 starts to detect the user's radio signal while other radio signal-enabled devices 304 start to see a weaker signal (e.g., a lower RSSI). Subsequently, using known signal power or RSSI location techniques mentioned above, the user's location (holding the non-cooperative device 301) is tracked in the area where the radio signal-enabled devices are installed.

The tracking information can then be used to analyze the behavior (e.g., a predicted future path of and/or website visited by the users) of the user and for predicting what the user will do while on a site, track criminal and suspicious behavior of any user. This technology may be used in retail, public and government places, service organizations, entertainment industries/venues, security and law enforcement applications and other places that may have a smart lamp network environment. In some embodiments, the invention depicts the predicted behavior (e.g., a predicted future path of the individuals) on a map on a display screen.

In some embodiments, the disclosed invention allows enterprises, merchants and service providers greater control over the information from visitors and what the visitors are doing when using their mobile devices on site. In some embodiments, the tracking information is captured in real time for immediate application to analytics, services and/or products. Pooling this information from radio signal-enabled devices and other different sources (point of sales terminals, iBeacon devices and/or WiFi access points) enables the disclosed invention to analyze the behavior of the visitors and predict what the visitors will do, based on different metrics and prior visits to the site or other sites. This information can be used to provide services and offers but can also be used by the location staff for different goals such as inventory/product placement and management, staffing support and scheduling, security/law enforcement services, object or person tracking on site (child, equipment, cleaning crew, VIP) and site layout and therefore improves inventory management, labor and employee management technologies, security and identification technologies, and lost-and-found technology, and the like.

The tracking information may also be used to tracking information of the non-cooperative user device is utilized to analyze behavior of a user using the non-cooperative user device and to predict what the user will do while in the area covered by the plurality of radio signal-enabled devices. The prediction of what the user will do while in the area may include predicting a future travel path of the non-cooperative user device, predicting what web sites the user will visit, and what products or services the user is likely to purchase. The tracking information may also be utilized to recognize the non-cooperative user device when the non-cooperative user device returns an area covered by the plurality of radio signal-enabled devices in a future time, for security purposes, for example recognition of bad actors when they return to an area. A more detailed description of how tracking information can then be used is provided in the U.S. Pat. No. 10,080,129, entitled "Method and Apparatus for Integrated Tracking of Visitors," the entire contents of which is hereby expressly incorporated by reference.

Figure 2:
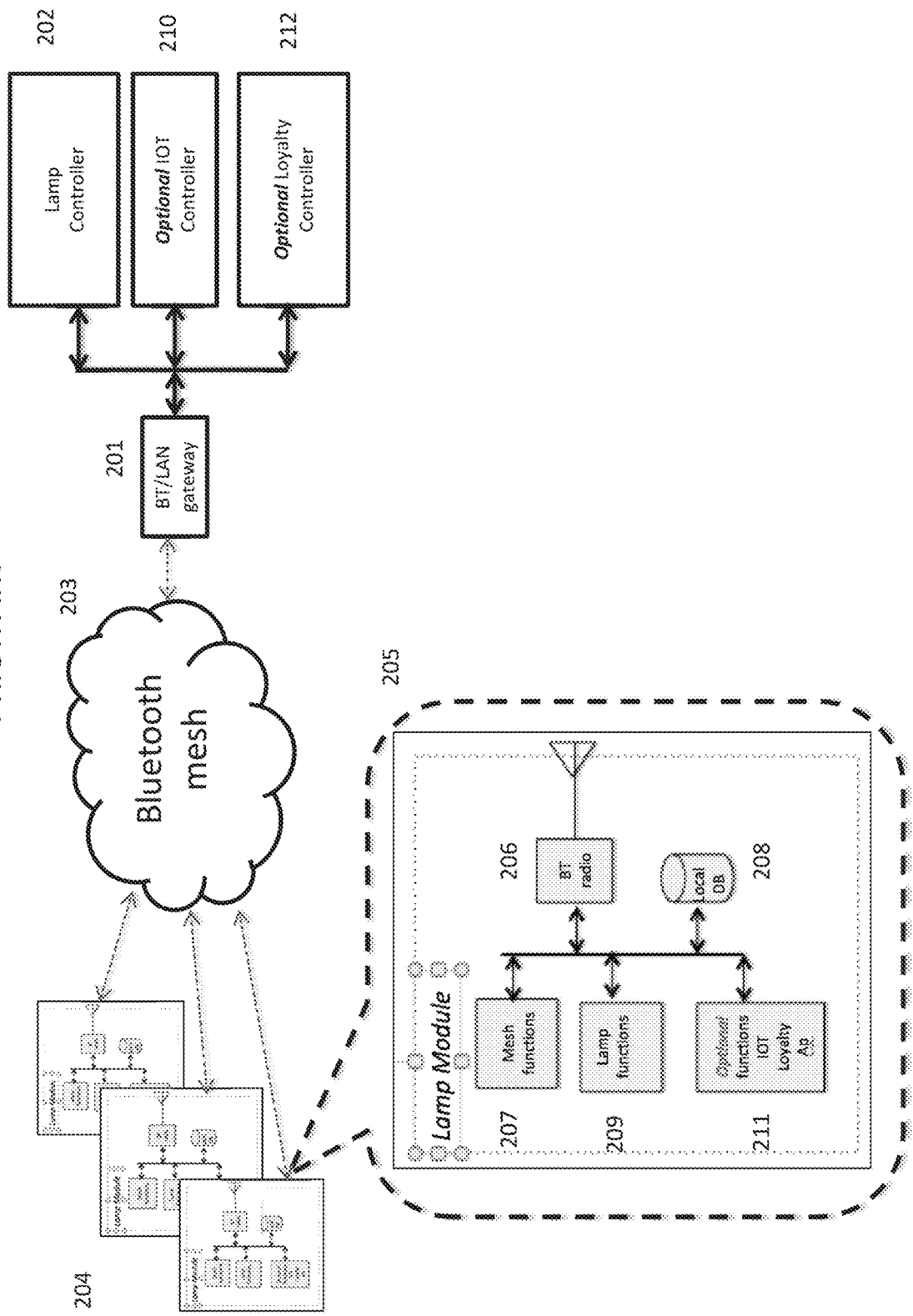
FIG. 2 is a block diagram illustrating a typical Bluetooth-based smart light network configuration.
Figure 4:
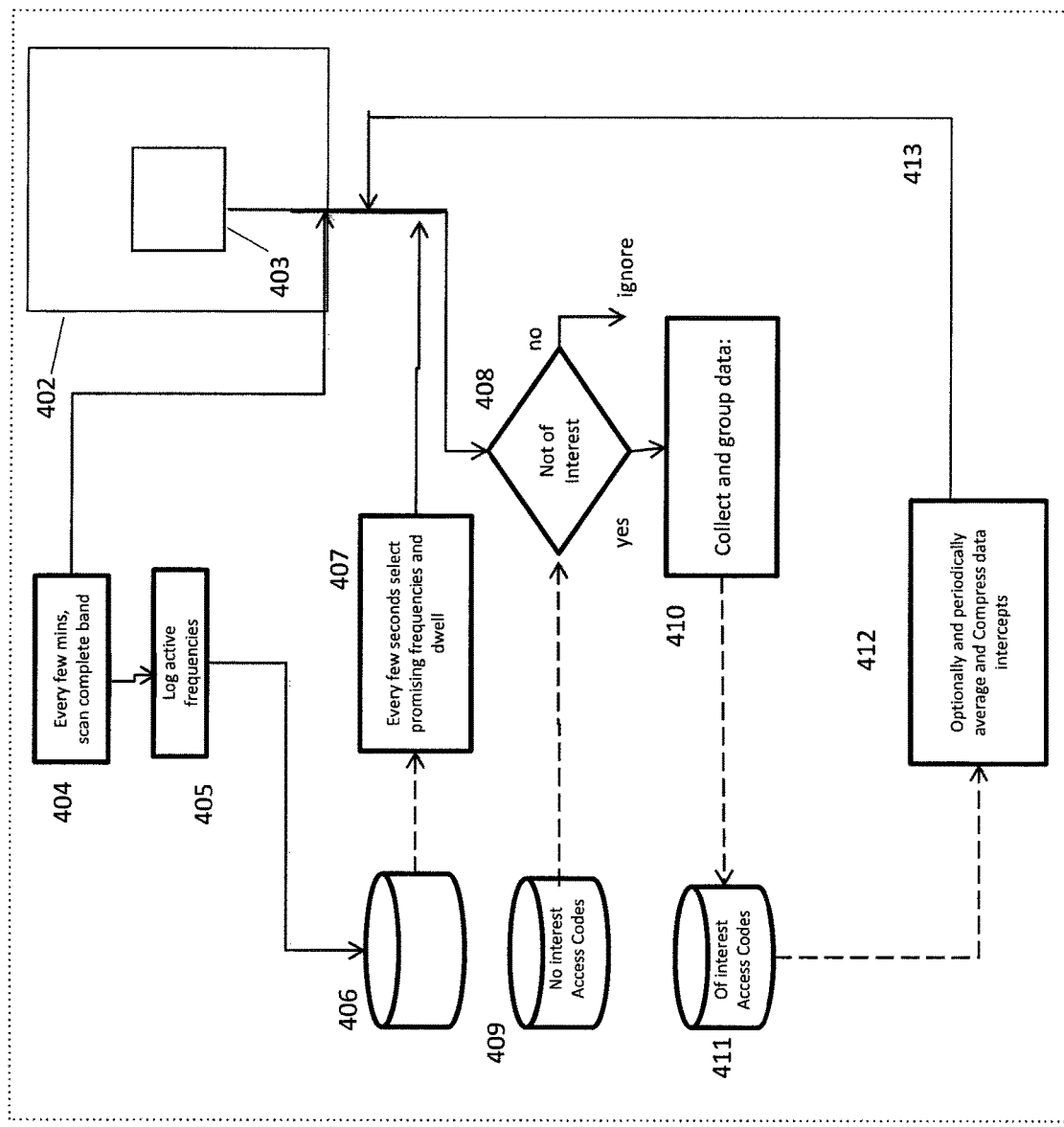
FIG. 4 is an exemplary process flow for detecting non-cooperative radio signal-enabled devices, according to some embodiments of the disclosed invention.

FIG. 4 is an exemplary process flow for detecting non-cooperative (unconnected) user devices that are not communicating with the wireless network, according to some embodiments of the disclosed invention. Typical functions of a radio signal-enabled device, for example, a smart lamp or IoT device, are shown in block 402 and are described above with respect to FIG. 2. A radio 403 is a hardware device that is connected to an internal communication bus of the radio signal-enabled device. The Mesh functions, device functions (e.g., Lamp or IoT functions) blocks may be software functions that execute on a controller (for example, controller 107 in FIG. 1) inside the radio signal-enabled device, while a local database is resident in memory.

In block 404, an environment survey function that dynamically determines which frequencies (e.g., of the possible 79 or 40 BT frequencies) are actually being used in the vicinity of a given radio signal-enabled device 402 is performed. FIG. 5B shows a histogram of activity at a certain time for a Bluetooth protocol, as an example. As shown, the center of the band is not being used. This is because the Bluetooth protocol has an Adaptive Frequency Hopping (AFH), which causes the hop pattern to be adjusted dynamically based on the local interference. Consequently, each radio signal-enabled device 402 has to independently determine which frequencies are being used in its local environment. As a result, every few minutes, the process in block 404 is executed by each radio signal-enabled device 402 to search the entire band, check all frequencies for activities (such as change in their power), and log/store the data, in block 405. This data (log) is then stored in a Frequency database 406.

In block 407, each radio signal-enabled device 402 selects a detected promising frequency with least interference of the non-cooperative user device (e.g., 301 in FIG. 3), every small period of time, for example, every one second. The process in block 407 is executed periodically (for example, for every one or few seconds) and causes the wireless radio of each radio signal-enabled device 402 to be tuned to a frequency as specified in a Frequency database 406. The wireless radio (of the signal-enabled device 402) dwells on that frequency for typically 100 msec and records the RSSI for every unique identification (e.g., access code) of the non-cooperative user devices that it detects. The unique device identification detected by the wireless radio of the signal-enabled device 402 is checked against a no interest database 409, in block 408. The no interest database 409 includes unique identification of the devices or equipment that are semi-permanent in the target area, such as computer workstations, etc., including those devices that do not generally move within the environment.

For example, each radio signal-enabled device 402 scans its local environment and produces a survey similar to what is shown in FIG. 5B, which is stored in the Frequency (in use) database 406. Using the data in Frequency database 406, a process in the radio signal-enabled device 402 determines which frequencies are being used at that time and at that location, as shown in block 407. For example, the process selects a promising frequency (with least interference) every few seconds and dwells every few hundred msec. For instance as shown in FIG. 5B, frequencies toward the bottom of the band are being used while frequencies in the middle of the band are not currently in use, probably because of a strong WiFi signal interference on those frequencies.

The process then ignores unique device identification (e.g., access codes) of any detections that are in the no interest database 409. Unique device identification that are not in the no interest database 409 list are stored and sorted in a signal of interest database 411, in block 410. The no interest database 409 includes a list of no interest signals, which is generated by the NCT processor 307 (in FIG. 3). As known in the art, all the databases may reside in one or more storage medium. Moreover, one or more of the databases may be combined as a single database. For example, the no interest database 409 and the signal of interest database 411 may be combined together in a single database residing on one or more storage mediums.

At the end of the (e.g., 100 msec) collection window, the radio interface is released and the typical functions of the networked radio signal-enabled devices continue to be executed. Every n (typically 5) seconds or so, an averaging and compression function is optionally executed on the intercepted signal of interest, in block 412. Typically, the value of "n" is a tradeoff between the amount of traffic each radio signal-enabled device 402 must send back over the pre-existing network and the potential movement of the non-cooperative (unconnected) user device during the "n" interval. If "n" is a large number, since all the collections from a given unique device identification are averaged into one value, the 50 intercepts of the same unique device identification get compressed into one value. However that one value may lose the resolution of the non-cooperative user device within the collection window. The system has the ability to adjust this value dynamically, based on the environment e.g., interferences) and the number of the non-cooperative user devices, where a mesh with a smaller number of radio signal-enabled device (or with radio signal-enabled devices subdivided into segment) can have smaller n.

In some embodiments, the functions of the NCT processor 307 may be incorporated into one or more of the processor in respective one or more of processor of the radio signal-enabled devices 402.

The optional averaging function examines the contents of a signal of interest in database 409 and merges intercepted signal of interest with the same unique device identification and computes the associated RSSI for the intercept signals. This data (typically including data associated with several unique device identification) may be compressed to reduce the mesh data load. Since the collection data at a given radio signal-enabled devices is typically an array, any number of standard compression approaches can be used. The resultant data is routed back to the mesh function of the radio signal-enabled devices 402 where it is output over a wireless network.

Typically the Bluetooth interface used in the smart lamps is an LE interface and is capable of being used for a complete LE communication session, as might be the case if the network is supporting a user loyalty program. However the use of an LE interface is compatible with using the Bluetooth interface to monitor the access codes associated with both LE and Classic BT. In some embodiments, the disclosed invention monitors both LE and Classic Bluetooth signals. However, because the enhancement is only detecting the address of the Bluetooth device in specific frequencies, a standard single mode LE interface can accomplish this task, where the firmware is modified to output header data.

Figure 5A:
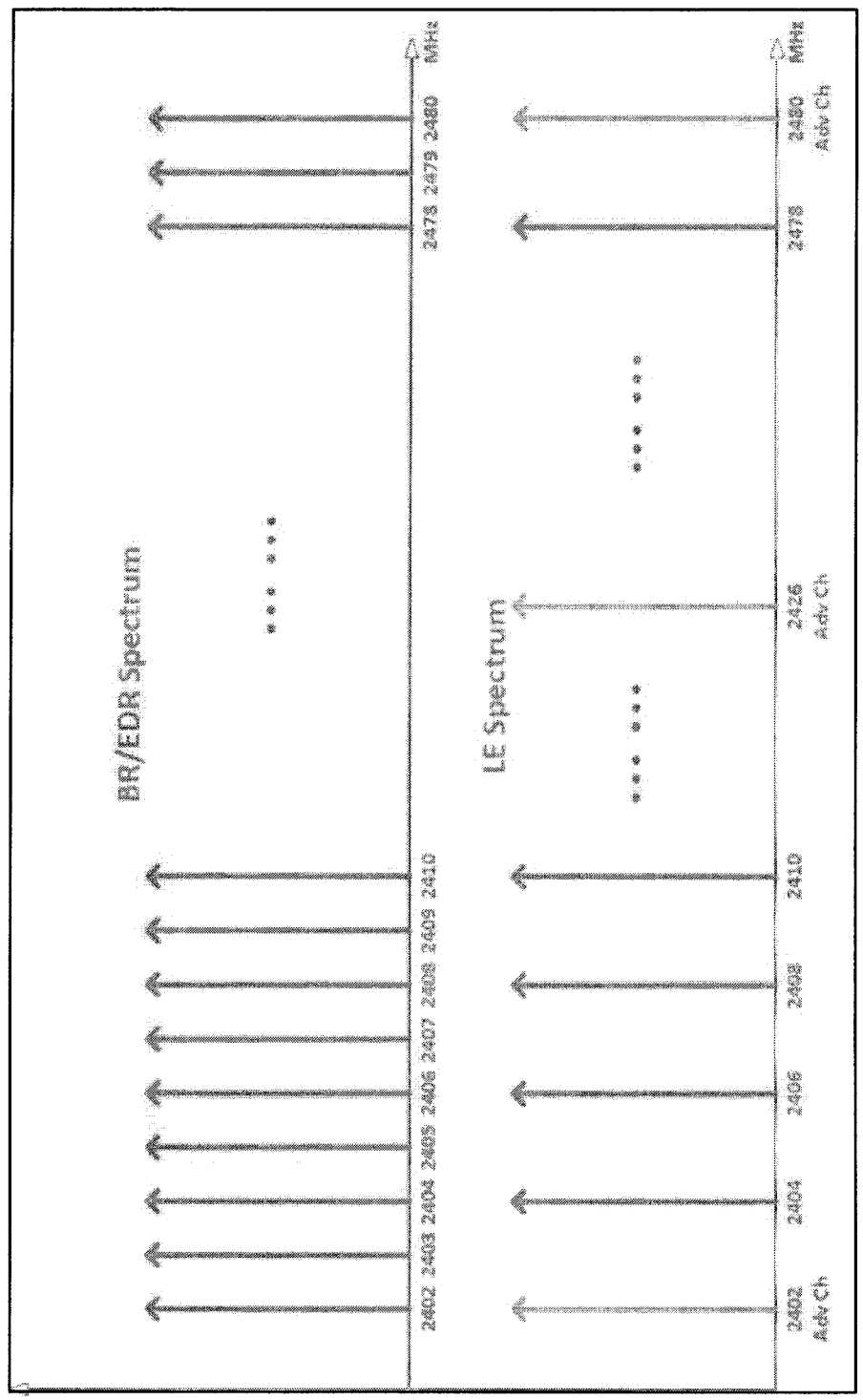
FIG. 5A is a graph depicted frequency spectrums for BLE, BR and LE channels.
Figure 5B:
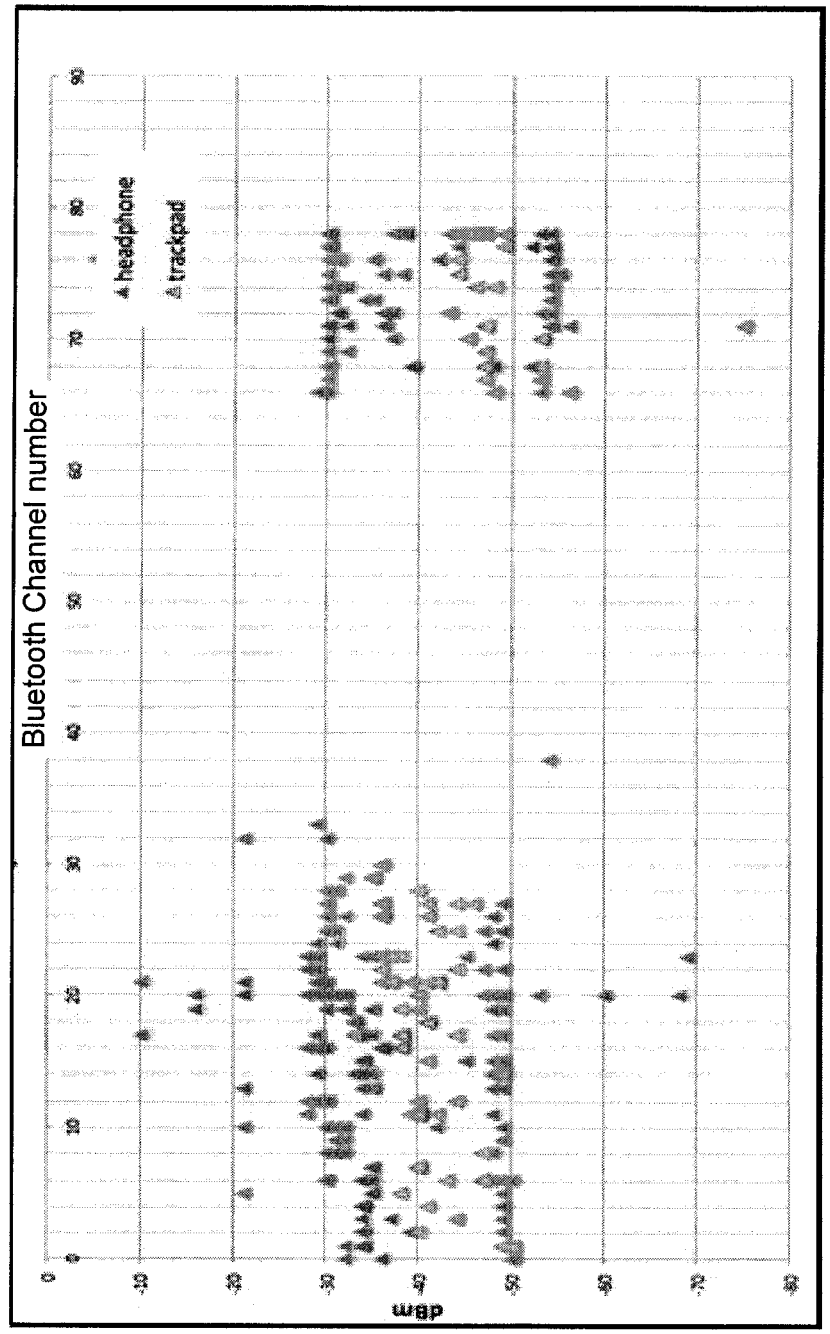
FIG. 5B is a histogram of BT frequencies activity at a certain time.

As an example, the Bluetooth protocol identifies 79 frequencies, with 1 MHz frequency separation for Classic Bluetooth and 40 frequencies with 2 MHz frequency separation for LE, which are shown graphically in FIG. 5A. All of the LE frequencies are coincident with BT frequencies. In addition, three of the LE channels are designated as advertising channels with the balance being LE data channels. Although there are 37 LE data channels, some of these frequencies may be unusable for Bluetooth because of local interference such as from any close by WiFi devices. The Bluetooth protocol has a feature called Adaptive Frequency Hopping (AFH) which allows the participants to adjust their hopping pattern to avoid local interference. For example, FIG. 5B shows how at a specific location the middle frequencies have been removed from the hop pattern, probably because of WiFi usage in that section of the band.

In some embodiments, the process for monitoring unique device identification (407) dwells on an active (promising) frequency for a period of time (e.g., 100 msec). In the example of a Bluetooth protocol, since an active connection is hopping at a rate of 1600 hops per second and since there are at most 79 frequencies in use, this session revisits the specific frequencies being monitored about 2 times in the 100 msec dwell time (2.03 observations per second=1600 hops per second*0.1 seconds dwell time/79 frequencies). This analysis is based on a Bluetooth communication session that has a continuous data exchange requirement, other radio signal protocols may have different, but similar timing requirements.

In the example of a Bluetooth protocol, the rate of data packets for audio over LE or Classic is a function of many factors but a typical mobile phone requires about 330 kbps payload. With a payload packet size of 320 bits per packet, this works out to about 1031 packets per second. While the hop rate is 1600 hops per second, the above value of 1031 packets per second indicates that on the average about 64% of the possible hop times are used. Consequently, the value of 2.03 visits per second calculated above should be reduced by a factor of 64% to 1.3 visits per second. On the other hand, the above calculation assumes that all 79 frequencies were being used. However, typically 60% of the frequencies will be used, restoring the original estimate of 2.2 visits per second. Table 1 below summarizes expected intercepts for both BR (Classic Bluetooth with 79 available frequencies) and LE (with 40 available frequencies).

TABLE 1

| | | Visits/sec with 100 msec dwell | | | |
|---|---|---|---|---|---|
| Mode | Channels | All channels used | Number of Intercepts | 60% channels used | Number of Intercepts |
| BR/EBR | 79 | 13.0 | 1.3 | 22.2 | 2.2 |
| LE | 40 | 25.6 | 2.6 | 42.6 | 4.3 |

Figure 6:
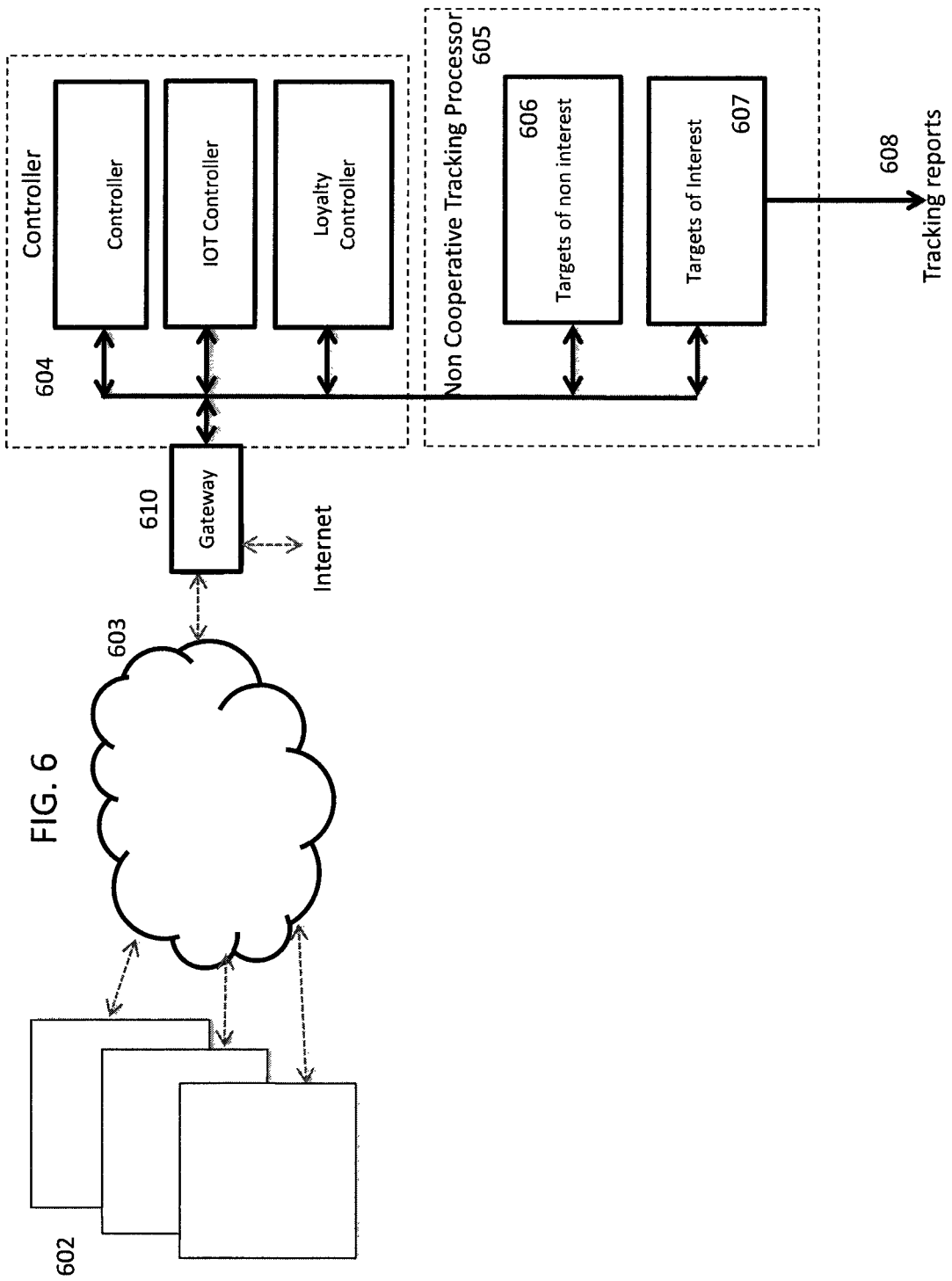
FIG. 6 is a block diagram of an exemplary radio signal-enabled device network, according to some embodiments of the disclosed invention.

FIG. 6 is a block diagram of an exemplary radio signal-enabled device network, according to some embodiments of the disclosed invention. The figure shows how the radio signal-enabled devices 602, such as IoT devices and smart lamps, are integrated into a system with a central processing capability. In some embodiments, the radio signal-enabled devices are augmented with additional software/firmware and/or hardware to implement the functionality of the disclosed invention. The radio signal-enabled devices 602 (e.g., smart lamps or IoT devices) are interconnected via a network 603 to a controller 604 and a Non Cooperative Tacking (NCT) processor 605. In some embodiments, the controller 604 is similar to the lamp controller 105, in FIG. 1. In some embodiments, the NCT processor 605 comprises of two portions 606 and 607. The radio signal-enabled devices 602 may also be connected to the Internet via the gateway 610.

A target of non interest portion 606 analyses all the intercepts from all the radio signal-enabled devices 602 and determines which unique device identification are of no interest. The no interest unique device identification include the devices or equipment that are semi-permanent in the target area, such as computer workstations, etc. A semi-permanent device presents a stable signal (e.g., a power signal such as an RSSI signal) to the same radio signal-enabled devices over time. There may be some changes in the received signal as objects move near the radio signal-enabled devices or the semi-permanent device, but when the processor determines a steady signature at all radio signal-enabled device sensors over a longer prior of time, for example, several hours, it can be accurately deduced that the device emitting the steady signal (for example, as signal the power of which is within a predetermined range for a predetermined amount of time) is a target of no interest. The unique device identification for the no interests signals (devices) are sent to a no interest database (e.g., database 407 in FIG. 4). The target of non interest portion 606 of the NCT processor 605 continues to process incoming data from the radio signal-enabled device sensor and update the databases on each radio signal-enabled device.

A target of interest portion 607 of the NCT processor 605 creates and updates a track file for use by external systems/devices, using time stamped unique device identification and received power signal (e.g., RSSI) from the non-cooperative user device, for example, 301 in FIG. 3). This way, a continuous stream of power signals is transmitted to the target of interest portion 607 of the NCT processor 605 from each of the radio signal-enabled devices 602. At a specific time, a specific user device emitting radio signal (e.g., Bluetooth or WiFi signals) is detected by several radio signal-enabled devices 602. The power signal, as seen at each radio signal-enabled devices, is then sent to the target of interest portion 607 of the NCT processor 605 for further processing.

The target of interest portion 607 of the NCT processor 605 knows the grid locations of each of the radio signal-enabled devices 602 and thus the power signal measurement provides an approximate range of the non-cooperative (unconnected) user device from the radio signal-enabled device. Using the set of ranges, the target of interest portion 607 locates the non-cooperative user device that is emitting radio signal in the grid. Over a shorter period of time, for example, several minutes, more data is collected and a movement track within the gird is developed for the non-cooperative user device that is emitting radio signal, and tracking reports 608 are produced and transmitted to the appropriate users/devices. Although, detection of a single non-cooperative user device emitting radio signals is described herein, many non-cooperative user devices may be detected and tracked simultaneously, using the same process as described above.

In some embodiment, the process of using unique device identification (e.g., access codes) to monitor successive communication messages between an audio device and headphones uses a standard Bluetooth radio to monitor an BLE frequency that is known to be in use for a duration long enough to statistically assure the frequency is visited and captures the header for the physical (PHY) layer. In some embodiment, in the case of a Bluetooth protocol, the process uses a standard Bluetooth radio to monitor a BR frequency that is known to be in use for a duration long enough to statistically assure the frequency is visited and captures the header for the PHY layer.

In some embodiment, each radio signal-enabled device sensor in a distributed network determines optimum monitoring frequencies by periodically surveying the entire frequency band at each sensor location to determine how the network has determined which frequencies to use for that location and at that time. The disclosed invention may periodically survey the entire band at each sensor location to determine how the wireless network has determined which frequencies to use for that location and at that time.

In some embodiment, the disclosed invention uses header in the PHY layer of a wireless protocol so that radio signal-enabled devices can be identified and tracked independent of the signatures that are in the wireless protocol payload and require different demodulations techniques. In some embodiment, radio/demodulation devices are controlled by a processor and output data back to the processor.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims and drawings.

What is claimed is:

1. A system for monitoring and tracking of non-cooperative devices comprising:
   a communication network;
   a plurality of radio signal-enabled devices communicating with each other via the communication network, each of the plurality of radio signal-enabled devices including a processor, associated memory, network interface and a predetermined location, wherein each of the plurality of radio signal-enabled devices is configured to:
      monitor interference signals and frequencies of the interference signals from a plurality of non-cooperative devices that are not coupled to the communication network; and
   a second processor coupled to the communication network and configured to:

receive interference signals and the frequencies from the plurality of radio signal-enabled devices, record a power level for each of the received interference signals;

identify signals of interest and filter out signals of no interest responsive to the power levels, detect a unique device identification for a non-cooperative user device not coupled to the communication network, responsive to the identified signals of interest, and track the non-cooperative user device responsive to the identified signals of interest and the predetermined locations of the plurality of radio signal-enabled devices.

2. The system of claim 1, wherein the second processor is one or more of the processors of respective one or more of the plurality of radio signal-enabled devices.

3. The system of claim 1, further comprising a first database for storing interference signals and frequencies of the interference signals, a second database for storing signals of no interest, and a third database for storing the unique device identification that are not in the second database.

4. The system of claim 3, wherein the second database stores unique identification of devices or equipment that are semi-permanent in an area covered by the plurality of radio signal-enabled devices, including devices that do not move within the area.

5. The system of claim 1, wherein the plurality of radio signal-enabled devices comprise a plurality of Bluetooth devices or a plurality of Internet of Things (IoT) devices.

6. The system of claim 1, wherein the power levels are based on signal strength indicator (RSSI).

7. The system of claim 1, wherein the second processor is further configured to average the signals of interest over a period of time.

8. The system of claim 1, wherein tracking information of the non-cooperative user device is utilized to analyze behavior of a user using the non-cooperative user device and to predict what the user will do while in an area covered by the plurality of radio signal-enabled devices.

9. The system of claim 1, wherein prediction of what the user will do while in the area includes one or more of predicting a future travel path of the non-cooperative user device, predicting what web sites the user will visit, and what products or services a user using the non-cooperative user device is likely to purchase.

10. The system of claim 1, wherein tracking information of the non-cooperative user device is utilized to recognize the non-cooperative user device when the non-cooperative user device returns to an area covered by the plurality of radio signal-enabled devices in a future time.

11. A method for monitoring and tracking of non-cooperative devices in a communication network that includes a plurality of radio signal-enabled devices communicating with each other, the method comprising:

monitoring, by each of the plurality of radio signal-enabled devices, interference signals and frequencies of the interference signals from a plurality of non-cooperative devices that are not coupled to the communication network;

receiving interference signals and the frequencies from the plurality of radio signal-enabled devices;

recording a power level for each of the received interference signals;

identifying signals of interest and filtering out signals of no interest responsive to the power levels;

detecting a unique device identification for a non-cooperative user device not coupled to the communication network, responsive to the identified signals of interest; and tracking the non-cooperative user device responsive to the identified signals of interest and the predetermined locations of the plurality of radio signal-enabled devices.

12. The method of claim 11, further storing interference signals and frequencies of the interference signals in a first database, storing signals of no interest in a second database, and storing the unique device identification that are not in the second database in a third database, wherein the second base stored unique identification of devices or equipment that are semi-permanent in an area covered by the plurality of radio signal-enabled devices, including devices that do not move within the area.

13. The method of claim 11, wherein the plurality of radio signal-enabled devices comprise a plurality of Bluetooth devices or a plurality of Internet of Things (IoT) devices.

14. The method of claim 11, wherein the power levels are based on signal strength indicator (RSSI).

15. The method stem of claim 11, further comprising averaging the signals of interest over a period of time.

16. The method of claim 11, further comprising utilizing tracking information of the non-cooperative user device to analyze behavior of a user using the non-cooperative user device and to predict what the user will do while in an area covered by the plurality of radio signal-enabled devices, wherein prediction of what the user will do while in the area includes one or more of predicting a future travel path of the non-cooperative user device, predicting what web sites the user will visit, and what products or services a user using the non-cooperative user device is likely to purchase.

17. The method of claim 11, further comprising utilizing tracking information of the non-cooperative user device to recognize the non-cooperative user device when the non-cooperative user device returns to an area covered by the plurality of radio signal-enabled devices in a future time.

18. A non-transitory computer storage medium for storing a plurality of computer instructions, the plurality of computer instructions, when executed by a processor, performing a method for monitoring and tracking of non-cooperative devices in a communication network that includes a plurality of radio signal-enabled devices communicating with each other, the method comprising:

monitoring, by each of the plurality of radio signal-enabled devices, interference signals and frequencies of the interference signals from a plurality of non-cooperative devices that are not coupled to the communication network;

receiving interference signals and the frequencies from the plurality of radio signal-enabled devices;

recording a power level for each of the received interference signals;

identifying signals of interest and filtering out signals of no interest responsive to the power levels;

detecting a unique device identification for a non-cooperative user device not coupled to the communication network, responsive to the identified signals of interest; and tracking the non-cooperative user device responsive to the identified signals of interest and the predetermined locations of the plurality of radio signal-enabled devices.

19. The non-transitory computer storage medium of claim 18, wherein the plurality of radio signal-enabled devices comprise a plurality of Bluetooth devices or a plurality of Internet of Things (IoT) devices.

20. The non-transitory computer storage medium of claim 18, where the method further comprises utilizing tracking information of the non-cooperative user device to recognize the non-cooperative user device when the non-cooperative user device returns to an area covered by the plurality of radio signal-enabled devices in a future time.

\* \* \* \* \*